United States Patent Office 3,499,850
Patented Mar. 10, 1970

3,499,850
VINYL CHLORIDE POLYMERIZATION
Richard C. Kinzie, Jr., Prince George, Va., assignor to Hercules Incorporated, Wilmington, Del., a corporation of Delaware
No Drawing. Filed Sept. 1, 1967, Ser. No. 664,904
Int. Cl. C08f 1/11, 3/30
U.S. Cl. 260—17                    7 Claims

ABSTRACT OF THE DISCLOSURE

Preparation of vinyl chloride polymers in the presence of hydroxypropyl cellulose and ethylenimine - modified hydroxypropyl cellulose as dispersing agent.

---

The present invention relates to polymerizing monomeric vinyl chloride alone or in admixture with other ethylenically unsaturated monomers. More particularly the present invention relates to a dispersion polymerization process wherein certain cellulose ethers are employed as dispersing agent to give polymeric products having unexpectedly high capacity for plasticizer sorption in the form of hard nontacky free-flowing beads.

The term "monomer" as used herein is intended to mean total monomer.

The term "dispersion polymerization process" as used herein is intended to mean a process wherein monomer is polymerized while dispersed in an aqueous medium with the aid of a dispersing agent to produce polymers which separate out of the polymerization reaction mixture in the form of beads.

The use of dispersing agents in the art is known to be essential for a number of reasons, one of which being to prevent or minimize polymer particles as produced from agglomerating into large hard lumps which require grinding before use. Heretofore various dispersing agents have been employed.

For most uses it is known that vinyl chloride polymers and copolymers must be plasticized before fabricating (e.g. molding or extruding) into the desired articles of manufacture. It is likewise known that such polymers do not sorb plasticizer readily at room temperature and pressure, thereby making it difficult to fabricate them and also giving fabricated articles of poor properties. In an effort to minimize these difficulties the prior art has employed troublesome and expensive techniques of polymer-plasticizer blending.

tion product of cellulose, propylene oxide and ethylenimine, said hydroxypropyl cellulose having an M.S. of at least 2, said reaction product having a hydroxypropyl M.S. of at least 2 and an aminoethyl (ethylenimine) M.S. of 0.01–3. M.S. is the average number of molecules of reactant combined with the cellulose per anhydroglucose unit.

The cellulose ether dispersing agents used herein are novel compounds. The hydroxypropyl cellulose and process of making are described and claimed in U.S. Patent No. 3,278,521. The dispersing agents (and process of making) formed as the reaction product of cellulose, propylene oxide and ethylenimine (sometimes referred to herein for simplicity as ethylenimine-modified hydroxypropyl cellulose) are described and claimed in application Ser. No. 542,178, entitled, Modified Hydroxypropyl Cellulose and Process, filed on Mar. 24, 1966 in the name of Eugene D. Klug as inventor, now U.S. Patent No. 3,431,254, granted Mar. 4, 1969.

The following examples illustrate various ways of carrying out the present invention, but they are not intended to limit the present invention beyond the scope of the appended claims. In the examples and elsewhere herein percent and parts are by weight unless otherwise indicated.

First there will be given a general description of the process used in carrying out the examples. This will be followed by tabulated data, and the two will give the invention more fully when considered together.

The dispersing agent was dissolved in water. The resulting solution, catalyst and monomer were added to a reaction vessel. The vessel was closed and the mixture allowed to polymerize while agitating for 20 hours at 45° C. The aqueous reaction mixture was drained off and the polymer product beads dried under 25 inches of mercury vacuum for 6 hours at 55° C. In each example there was used (by weight of the total reaction mixture) 100 parts vinyl chloride, 0.5 part lauroyl peroxide initiator (i.e. 1.5 parts by weight of monomer) and 200 parts water. Type and amount of dispersing agent were varied. The manner or sequence of adding the ingredients in preparing the reaction mixture is not critical.

The polymeric product in each example was evaluated for plasticizer sorption.

Further details appear in Table 1 hereinafter wherein HPC is hydroxypropyl cellulose, EI–HPC is ethylenimine-modified hydroxypropyl cellulose, HEC is hydroxyethyl cellulose and M–HPC is methyl hydroxypropyl cellulose.

TABLE 1

| Example No. | Present invention | | | | | Prior art | | | | |
|---|---|---|---|---|---|---|---|---|---|---|
| | 1 | 2 | 3 | 4 | 5 | 6 | 7 | 8 | 9 | 10 |
| Dispersing agent | HPC | HPC | EI–HPC | EI–HPC | EI–HPC | HEC | HEC | HEC | M–HPC | M–HPC |
| Hydroxyalkyl M.S. | 3.5 | 3.7 | 2.75 | 2.75 | 3.4 | 2.5 | 2.5 | 1.9 | 0.14 | 0.14 |
| Aminoethyl M.S. | | | 0.21 | 0.55 | 0.34 | | | | ¹ 1.68 | ¹ 1.68 |
| Dispersing agent, conc., percent | 0.5 | 0.9 | 0.3 | 0.08 | 0.3 | 0.05 | 0.5 | 0.3 | 0.3 | 0.9 |
| Plasticizer sorption, parts per part polymer | 1.24 | 1.34 | 1.67 | 1.70 | 1.77 | 0.77 | 0.61 | 0.71 | 0.55 | 0.60 |

¹ Methoxyl.

It has been found in accordance with the present invention that polymers having unexpectedly high capacity for plasticizer sorption in the form of hard nontacky free-flowing beads are produced by carrying out the process which comprises mixing vinyl chloride monomer and from 0% to preferably not inexcess of about 25% (generally not in excess of about 10%) by weight of one or more other ethylenically unsaturated monomer with a cellulose ether dispersing agent to form an aqueous dispersion, and polymerizing the dispersion, the cellulose ether dispersing agent being selected from the group consisting of (1) hydroxypropyl cellulose and (2) the reac- In the foregoing examples plasticizer sorption was determined by A.S.T.M. D 1755–60t method, a standard procedure in this art. The aminoethyl M.S. of the polymeric products was calculated from the nitrogen content determined by the Kjeldahl method, and the hydroxypropyl M.S. was determined by the terminal methyl method. The terminal methyl method is reported by Lemieux and Purves, beginning at page 485, vol. 25B, 1947, of Canadian Journal of Research.

From the foregoing examples it is readily apparent that the dispersing agents of the present invention give polymers of exceptionally high plasticizer sorption values, These polymeric products have two very important advantages. They are substantially easier to fabricate into desired articles of manufacture and the articles have better properties. The polymeric products of the present invention also have good particle size distribution, hence the product forms in the polymerization reaction mixture as easily handled beads instead of in difficult to handle lumps. Substantially all of the polymer particles pass through a 30 mesh screen and substantially all are retained on a 200 mesh screen (U.S. Standard Sieve series).

As to the hydroxypropyl cellulose compounds applicable herein as dispersing agents, it should be kept in mind that they must be of the type set forth in U.S. Patent No. 3,278,521 referred to hereinbefore. Other hydroxypropyl cellulose compounds are outside the scope of the present invention because they do not give the desired plasticizer sorption. Hydroxypropyl cellulose compounds (and process of preparing same) applicable as dispersing agents herein are amply described in said patent.

The above identified copending application adequately describes the ethylenimine-modified hydroxypropyl cellulose compounds (and process of preparing same) applicable herein as dispersing agents; however, information as to these will be given here also as a matter of convenience. These compounds are the reaction product of cellulose, propylene oxide and ethyleneimine. They have a hydroxypropyl M.S. of at least 2 (preferably 3–5) and an aminoethyl M.S. of 0.01–3.0 (preferably 0.05–1.0). These dispersing agent compounds are prepared by reacting together cellulose, propylene oxide and ethylenimine at an elevated temperature and pressure in the presence of aqueous alkali and etherification reaction diluent. The following will serve as a detailed example of a suitable way of preparing the ethylenimine-modified hydroxypropyl cellulose dispersing agents applicable herein.

A mixture of 1 part cellulose (cotton linters), 0.1 part NaOH, 0.4 part water, 2 parts tertiary butyl alcohol and 9 parts heptane is stirred for one hour. Then 3 parts propylene oxide and 0.21 part ethylenimine are added and the mixture heated at elevated pressure and 70° C. for 16 hours. The reaction mixture is then cooled and the excess liquor filtered off. Steam is passed through the filter cake to drive off residual heptane. The filter cake is then stirred in hot water (about 90° C.) and the pH is decreased to about 9 with 85% $H_3PO_4$. The product is thoroughly washed with hot water (about 90° C.) and dried at about 120° C. The product has a hydroxypropyl M.S. of approximately 4 and an aminoethyl M.S. of about 0.40.

Various other conditions are pertinent but are not critical in carrying out the present invention, nor are they per se a part of this invention. For the sake of completeness and ease of understanding, these conditions will now be described briefly; however, these conditions are described by way of example only and not limitation and this applies to amounts as well as to types of materials employed. Furthermore once the artisan knows to use applicant's dispersing agents these other conditions will be readily apparent as matters more fully disclosed in the prior art. These conditions include e.g. the amounts of dispersing agent, comonomers which may be used along with vinyl chloride, relative proportions of vinyl chloride and comonomers, amounts of monomer, catalysts and amounts thereof, polymerization temperature.

The amount of dispersing agent may vary over a fairly wide range which will usually be about 0.001%–1.0%, preferably about 0.05%–0.5%, by weight of the polymerization reaction mixture. The water/monomer weight ratio normally will be about 1/1–4/1. The amount of initiator will be about 0.001%–3.0%, preferably about 0.1%–0.8%, by weight of monomer. Preferably the total amount of comonomer employed with the vinyl chloride will not exceed about 25%, usually about 10%, by weight of the vinyl chloride.

As stated hereinbefore ethylenically unsaturated monomers (particularly unsaturated vinyl or acrylic monomers) in general are applicable as comonomers with vinyl chloride, typical ones of which include e.g. vinylidine chloride, vinyl esters (e.g. vinyl acetate), esters of acrylic acid and methacrylic acid (e.g. methyl acrylate and methyl methacrylate).

Several different type initiators are applicable including e.g. peroxy compounds in general (typical of which are lauroyl peroxide, benzoyl peroxide, dicumyl peroxide and 2,4 dichlorobenzoyl peroxide) and ammonium and alkali metal persulfates, lauroyl peroxide perhaps being most commonly used.

Polymerization temperatures may range from about 10° C.–80° C. with times of about one hour to several days but generally polymerization temperatures of about 40° C.–65° C. with polymerization times of about 8–24 hours are used, temperature and time varying inversely.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process of manufacturing polymers having a high capacity for plasticizer sorption which comprises mixing vinyl chloride monomer and from zero to about 25% by weight of at least one other vinyl or acrylic monomer with a cellulose ether dispersing agent to form an aqueoous dispersion, and polymerizing the dispersion, the cellulose ether dispersing agent being selected from the group consisting of (1) hydroxypropyl cellulose and (2) the reaction product of cellulose, propylene oxide and ethylenimine, said hydroxypropyl cellulose having an M.S. of at least 2, said reaction product having a hydroxypropyl M.S. of at least 2 and an aminoethyl M.S. of 0.01–3.0.

2. Process of claim 1 wherein the dispersing agent is hydroxypropyl cellulose having an M.S. of at least 2.

3. Process of claim 1 wherein the dispersing agent is hydroxypropyl cellulose having an M.S. of 3–5.

4. Process of claim 1 wherein the dispersing agent is the reaction product of cellulose, propylene oxide and ethylenimine having a hydroxypropyl M.S. of at least 2 and an aminoethyl M.S. of 0.01–3.

5. Process of claim 1 wherein the dispersing agent is the reaction product of cellulose, propylene oxide and ethylenimine having a hydroxypropyl M.S. of 3–5 and an aminoethyl M.S. of 0.05–1.0.

6. Process of claim 1 wherein the amount of cellulose ether dispersing agent is 0.003%–1.0% by weight of monomer.

7. Process of claim 1 wherein the amount of cellulose ether dispersing agent is 0.05%–0.5% by weight of monomer.

References Cited

UNITED STATES PATENTS

| | | | |
|---|---|---|---|
| 2,875,186 | 2/1959 | Gerhard et al. | 260—92.8 |
| 3,205,204 | 9/1965 | Heckmaier et al. | 260—87.1 |
| 3,278,521 | 10/1966 | Klug | 260—231 |
| 3,293,199 | 12/1966 | Abercrombie | 260—17 |

HAROLD D. ANDERSON, Primary Examiner

L. M. PHYNES, Assistant Examiner